(12) United States Patent
Stytz et al.

(10) Patent No.: US 6,917,974 B1
(45) Date of Patent: Jul. 12, 2005

(54) METHOD AND APPARATUS FOR PREVENTING NETWORK TRAFFIC ANALYSIS

(75) Inventors: Martin R. Stytz, Beavercreek, OH (US); Sheila B. Banks, Orlando, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 723 days.

(21) Appl. No.: 10/039,575

(22) Filed: Jan. 3, 2002

(51) Int. Cl.⁷ .......................... G06F 15/173; G06F 11/30
(52) U.S. Cl. ....................... 709/225; 709/243; 713/201; 713/150
(58) Field of Search .............................. 709/203, 225, 709/243, 239; 713/201, 163, 200, 203, 150

(56) References Cited

U.S. PATENT DOCUMENTS

| | | | | |
|---|---|---|---|---|
| 5,177,788 A | * | 1/1993 | Schanning et al. ......... | 713/201 |
| 5,490,729 A | * | 2/1996 | Ishihara ..................... | 384/43 |
| 6,038,219 A | * | 3/2000 | Mawhinney et al. ........ | 370/242 |
| 6,130,889 A | * | 10/2000 | Feldman et al. ............ | 370/397 |
| 6,141,705 A | * | 10/2000 | Anand et al. ............... | 709/203 |
| 6,502,135 B1 | * | 12/2002 | Munger et al. ............. | 709/225 |
| 6,567,914 B1 | * | 5/2003 | Just et al. .................. | 713/160 |
| 6,789,119 B1 | * | 9/2004 | Zhu et al. .................. | 709/203 |
| 2002/0078384 A1 | * | 6/2002 | Hippelainen ............... | 713/201 |
| 2002/0111997 A1 | * | 8/2002 | Herlihy ..................... | 709/203 |
| 2002/0150099 A1 | * | 10/2002 | Pung et al. ................ | 370/390 |
| 2002/0161884 A1 | * | 10/2002 | Munger et al. ............ | 713/200 |
| 2002/0166063 A1 | * | 11/2002 | Lachman et al. .......... | 713/200 |
| 2002/0174362 A1 | * | 11/2002 | Ullmann et al. ........... | 713/201 |
| 2003/0014623 A1 | * | 1/2003 | Freed et al. ............... | 713/150 |
| 2003/0018912 A1 | * | 1/2003 | Boyle et al. ............... | 713/201 |
| 2003/0110229 A1 | * | 6/2003 | Kulig et al. ................ | 709/207 |
| 2003/0112766 A1 | * | 6/2003 | Riedel et al. ............... | 370/252 |

OTHER PUBLICATIONS

Robert C. Durst et al., TCP extensions for space communications, 1997, J.C. Baltzer AG, Science Publishers, Wireless Networks 3 (1997), 389–403.*

Maire McLoone and John V McCanny, A Single–Chip IPSEC Cryptographic Processor, 2002, IEEE, 0–7803–7587–4, pp. 133–138.*

Rajesh Talpade et al., NOMAD: Traffic–based Network Monitoring Framework for Anomaly Detection, 1999, IEEE, 0–7695–0250–4.*

Mikael Degermark et al., Low–Loss TCP/IP Header Compression for Wireless Networks, Nov. 1996, ACM, 0–89791–872–X, pp. 1–14.*

(Continued)

Primary Examiner—Valencia M Wallace
Assistant Examiner—Ajay Bhatia
(74) Attorney, Agent, or Firm—AFMCLO/JAZ; Gina S. Tollefson; Gerald B. Hollins

(57) ABSTRACT

A system and method for generating and transmitting false packets along with a true packet to thereby hide or obscure the actual message traffic. A new extension header having a plurality of fields is positioned in the hierarchy of Internet protocol headers that control passage of the false packets and the true packet through the network. A sending host computer generates a plurality of false packets for each true packet and transmits the false packets and the true packet containing the Internet protocol headers and the extension header over the network. The new extension header is decrypted and re-encrypted each host that handles a message packet that uses the new extension header to control the random re-encryption of the true packet body at random hosts and the random generation of false packets at each host visited by a true packet, at the recipient of the true packet, and at any hosts that receive a false packet.

20 Claims, 11 Drawing Sheets-

| NEW EXTENSION HEADER FIELD NAME | MINIMUM SIZE | FIELD DESIGNATOR |
|---|---|---|
| Extension Header Size | 128 bits | 0 (zero) |
| Packet Type | 2 bits | A |
| Requested Number of False Packets | 8 bits | B |
| Minimum Hops for False Packets | 8 bits | C |
| Minimum False Packet Body Size (Bytes) | 32 bits | D |
| Maximum False Packet Body size (Bytes) | 32 bits | E |
| Baseline False Packet Body Size (Bytes) | 32 bits | F |
| True Packet (Message) Source Address | 128 bits | G |
| Packet Body Re-encrytion Permitted | 1 bit | H |
| False Packet Generation Probablity | 8 bits | I |
| False Packet Generation Probablity Decay Rate | 8 bits | J |
| Re-encryption Performed | 1 bit | K |
| Re-encryption Probability | 8 bits | L |
| Total number of Re-encryptions | 32 bits | M |
| Decryption Key Pointer | 128 bits per re-encryption | N |

OTHER PUBLICATIONS

S. Deering et al., RFC 2460 Internet Protocol, Version 6 (IPv6) Specification, Dec. 1998.*

S. Kent et al., RFC 2402 IP Authentication Header, Nov. 1998.*

Robert A. Hinden, IP Next Generation Overview, Jun, 1996, Communications of the ACM, vol. 39, No. 6, pp. 61–71, 0002–0782.*

Atila Pasztor et al., The Packet Size Dependence of Packet Pair Like Methods, 2002, IEEE, 0–7803–7426–6.*

* cited by examiner

| NEW EXTENSION HEADER FIELD NAME | MINIMUM SIZE | FIELD DESIGNATOR |
|---|---|---|
| Extension Header Size | 128 bits | 0 (zero) |
| Packet Type | 2 bits | A |
| Requested Number of False Packets | 8 bits | B |
| Minimum Hops for False Packets | 8 bits | C |
| Minimum False Packet Body Size (Bytes) | 32 bits | D |
| Maximum False Packet Body size (Bytes) | 32 bits | E |
| Baseline False Packet Body Size (Bytes) | 32 bits | F |
| True Packet (Message) Source Address | 128 bits | G |
| Packet Body Re-encrytion Permitted | 1 bit | H |
| False Packet Generation Probablity | 8 bits | I |
| False Packet Generation Probablity Decay Rate | 8 bits | J |
| Re-encryption Performed | 1 bit | K |
| Re-encryption Probabilty | 8 bits | L |
| Total number of Re-encryptions | 32 bits | M |
| Decryption Key Pointer | 128 bits per re-encryption | N |

Fig. 2

| NEW EXTENSION HEADER FIELD NAME | MEANING | BIT DEFINITIONS |
|---|---|---|
| Extension Header Size | Size (in bits) of the new extension header within the current packet | N/A |
| Packet Type | Type of packet being transmitted | 00 - True packet<br>01 - First generation false message packet<br>10 - Second or later generation false message packet.<br>11 - First generation false message packet generated by an intermediate host between originator and recipient of true message packet |
| Requested Number of False Packets | Number of first generation false packets requested to be generated by true message packet recipient | N/A |
| Minimum Hops for False Packet | Number of laps within the network that a false packet must complete | N/A |
| Minimum False Packet Body Size (Bytes) | Minimal size in bytes of the payload (data segment) in the packet for a false message packet | N/A |
| Maximum False Packet Body size (Bytes) | Maximum size in bytes of the payload (data segment) in the packet for a false message packet | N/A |
| Baseline False Packet Body Size (Bytes) | Actual size in bytes of the payload (data segment) in the true current message packet | N/A |

*Fig. 3*

| | NEW EXTENSION HEADER FIELD NAME | MEANING | BIT DEFINITIONS |
|---|---|---|---|
| 324 | True Packet Source Address | IPv6 address of the source of the true message packet | N/A |
| 326 | Re-encryption Permitted | Whether intermediate hosts can add a new level of encryption to packet by re-encrypting the body of the message packet | 0 - re-encryption is not permitted<br>1 - re-encryption is permitted |
| 328 | False Packet Generation Probablity | Binary value for the false packet generation probability | 0 - false packet generation probability is zero<br>>0 - false packet generation probability. Value is equal to 1 divided by the decimalized value of the bit representation |
| 330 | False Packet Generation Probablity Decay Rate | Binary value for the false packet generation probability decay rate | 11111111 - false packet generation probability is set to zero after generating one false packet.<br><11111111 - bit value to be added to False Packet Generation Probability value each time a false packet is generated at a host |
| 332 | Re-encryption Performed | Whether an intermediate host has re-encrypted the packet body | N/A |
| 334 | Re-encryption Probablity | Binary value for the probability that re-encryption will be performed on the packet | 0 - re-encryption probability is zero<br>>0 - re-encryption probability. Value is equal to 1 divided by the decimalized value of the bit representation |
| 336 | Total Number of Re-encryptions | A count of the number of reen-encryptions performed on a given packet as it moved through the network | N/A |
| 338 | Decryption Key Pointer | Designator for each decryption key needed to undo encryption applied by an intermediate host | N/A |

*Fig. 3A*

Procedure 5.2

Procedure 5.3

Procedure 5.4

Procedure 4.1

METHOD AND APPARATUS FOR PREVENTING NETWORK TRAFFIC ANALYSIS

FEDERAL RESEARCH STATEMENT

The invention described herein may be manufactured and used by or for the Government of the United States for all governmental purposes without the payment of any royalty.

BACKGROUND OF INVENTION

The present invention relates to data communications and more particularly to a method and system for preventing traffic analysis of packet-switched networks operating under the standard Transmission Control Protocol and Internet Protocol.

There are currently no known effective technologies for preventing network traffic analysis. Although Internet Protocol (IP) level security now addresses many threats to confidentiality, integrity, and authentication, it does not address the traffic analysis vulnerabilities. These vulnerabilities enable adversaries to passively perform center of gravity analysis, topology mapping, and operating system or application version identification, even on encrypted information, and thereby enable them to extract significant information. In fact, these vulnerabilities can not be addressed by any current encryption or authentication schemes. These vulnerabilities arise from inconsistent fragmentation, resolution of timing information, and over specification of specific fields like the Time To Live field, in addition to the statistical behavior of network traffic. The widely used IP version 6 (IPv6) was designed under the assumption of a benign environment and with the goal of conserving network bandwidth. Privacy enhancements proposed for IPv6 seem necessary but do not appear to be sufficient for addressing some of these concerns.

Computer network traffic is subject to interception and/or monitoring by unauthorized systems known as sniffers that can easily tap into a communication stream and can determine the source, destination, and even probable content of the message traffic. Because message in a Transmission Control Protocol and Internet Protocol based network traverses the network in packets, these sniffers are commonly called packet sniffers. With some types of physical layer network technologies, such as Ethernet or token ring, a sniffer placed on any computer on the network can read all of the messages that come across the network and can determine traffic patterns and source/destination information. The value of the information acquired can be significantly reduced if the apparent traffic patterns are not the actual traffic patterns. If extra network traffic that contains no information and has no significance is present in the network traffic then analytical techniques will fail and the true traffic will be protected from network analysis.

In the standard Transmission Control Protocol and Internet Protocol (TCP/IP) approach to network communications, data is transmitted from computer to computer on the network using data packets. Each data packet is composed of a header and a body. The IP packet header can contain information relating to security, packet sequencing, addressing, packet data integrity, and packet size, but it does not contain the data that is being transferred. The data in the packet is contained in the body (payload) of the packet, which is called the data segment. The highest level of the TCP/IP protocol stack, the application layer, contains the application(s) that generate and receive data. The transport layer provides reliable end-to-end, (sender-to-recipient) communication. For outgoing data, the transport layer Inserts the data given to it by the application layer into TCP formatted packets. These packets are then passed down the stack to the Internet (or IP) layer. For Incoming data, the transport layer receives TCP-formatted packets from the Internet layer In the stack, strips off the TCP header, performs whatever validity checking and message re-assembly operations are required, and passes the complete message on to the destination application in the application layer. TCP operates only in the transport layer and uses symbolic (or logical) addressing to Indicate the sender and the recipients of the data. The Internet, or IP, layer is directly below the transport layer. The Internet layer manages communication between computers on the network using logical addresses. For incoming data, the IP layer receives the packets of data, called datagrams, that arrive from the network layer, strips off the IP headers, checks the validity of the incoming data, and passes the data segment on to the transport layer. For outgoing data, IP performs routing of data and places the data into IP-formatted packets. Routing is the process of choosing a path through the network, or internetwork, for packets to follow. The network interface layer manages the transmission of the data over the physical network and deals In real addresses and the problems that arise when dealing with a physical medium. Unlike the other three layers, the network Interface layer only uses real addresses, not logical, addresses on the network.

In the TCP/IP approach, computer-to-computer communications are conducted on a peer-to-peer basis between protocol stacks. For example, the TCP layer on one computer communicates only with the TCP layer on any other computer, all of the intervening layers of the TCP/IP protocol stacks on its own machine, the recipients machine, and intermediate router machines operate in a manner that is transparent to the sender's and recipients' TCP layer. Each packet is composed of a header and a body (or data) segments; therefore, clearly the body of a message at one layer of the stack will contain the header and data segment information for higher layers in the stack. Outgoing packets are, then, nested structures. The output from a higher layer level of the stack is placed into the data segment portion of the structure and the resulting header and data segment combined serves as input to the next layer of the stack when data is being transmitted. For data reception, the process operates in reverse. Each layer of the stack strips off its particular header segment information before passing along the data segment portion to the next higher level in the stack, where that level processes it as a header and a data segment.

Security and authentication are a concern for communication and their importance will only increase. Therefore, the ability to employ a number of different authentication and security measures within a single network environment will be advantageous. The security and authentication options provided In the basic IPv6 header permit a number of different security levels and types of encryption to be in operation simultaneously within the same network and the level of security for the data in a packet can be determined solely by examining the IP packet header.

SUMMARY OF INVENTION

An object of the present invention is to provide a system and method for defense against network traffic analysis.

It is another object of the invention to provide an extension header in the hierarchy of standard IP headers controlling the network having data fields for defining and controlling the transfer of true and false message traffic between network host computers.

It is another object of the invention to defeat network traffic analysis by generating a volume of false network traffic from the sending host computer, the recipient host and hosts on the network pathway between the sender and the recipient, and other hosts that are recipients of the false network traffic.

It is a further object of the invention to provide a defense against center of gravity analysis, topology mapping, and operating system and application version identification on network traffic, whether the network traffic is encrypted or unencrypted.

The invention does not replace, duplicate, or reduce the need for encryption to protect the content of a message. Instead, the Invention provides additional security that augments the protection provided by encryption.

For the purposes of this Invention, the following other terms are defined. The term "true packet" is used to signify a packet that carries an actual message. A true packet is used to carry actual data from one computer to another on a computer network. The term "false packet" is used to signify a packet that is used to obscure the route and destination of a true packet. A false packet carries no actual information but is intended to appear as though It does carry actual data because its size and movement through the network mimics the movement and size of a true packet. A false packet is any packet that is not a true packet. False packets may be acknowledged at the TCP layer in order for the false message traffic to better obscure the true message traffic.

An "intermediate host" is any computer host on the network that lies along the network route from the sender to the desired recipient of a true message packet. An intermediate host is also any computer host that receives a false message packet enroute from a computer host along the network route from the sender to the packet's addressee. The term "re-encryption" is the process of adding, or performing, an additional encryption to an encrypted message. The term "payload" is used to signify the part of a message packet that carries all of the information not in the IP header portion of a packet. The terms "data segment" and "body" are synonyms for the term payload. The payload for a packet at the IP level contains the TCP header as well as the data being transmitted The Invention relates to a system and method for generating and transmitting false packets along with a true packet to thereby hide or obscure the actual message traffic. A new extension header is positioned in the hierarchy of Internet protocol headers that control passage of the false packets and the true packet through the network. Fields in the extension header designate the size of the extension header, the message packet type, the maximum number of false packets to be generated by a host, the minimum number of hops that the false packets will traverse, the minimum, maximum and baseline for the false packet body size, the recipient address for the true packet, whether re-encryption is permitted, the false packet generation probability, the decay rate for the false packet generation probability, the total number of re-encryptions performed, and the decryption key pointer value. The sending host computer generates a plurality of false packets for each true packet and transmits the false packets and the true packet containing the Internet protocol headers and the extension header over the network.

According to the Invention, each network host computer that handles a message packet that uses the new extension header stores the values from the fields of the extension header and determines from the generation probability whether to generate a new false packet. Upon receipt of a packet, the host makes the maximum number of attempts to generate a false packet. A false packet is generated for a given attempt whenever a randomly selected number exceeds the false packet generation probability.

The present invention may be described as a series of steps implemented by a data processor in hardware, software, or firmware, or a combination thereof. As a software application, the invention could be written in any suitable programming language commonly known and used by those skilled in the art, including but not limited to C, CC++, and Java. A program listing in pseudo code is incorporated herein by reference.

BRIEF DESCRIPTION OF DRAWINGS

The foregoing and other objects, features and advantages of the present invention will be better understood from the following detailed description of a preferred embodiment of the invention with reference to the drawings, wherein:

FIG. 2 is a diagram of the IPv6 message format for different fields of the extension header;

FIG. 3 and FIG. 3A is a diagram showing the meaning and definitions associated with the different fields of the extension header;

DETAILED DESCRIPTION

Figure 1:
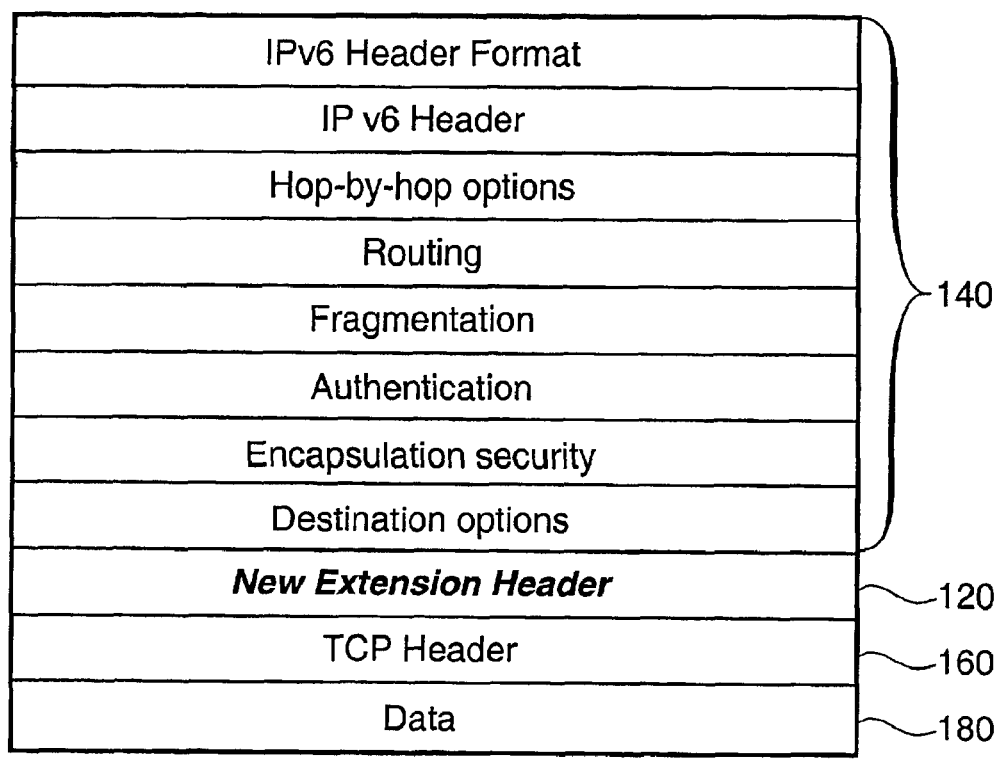
FIG. 1 is a diagram of the standard IPv6 basic header format showing the placement of the extension header according to the invention.

In a preferred embodiment, the system and method according to the present invention is used to produce false network traffic dynamically when network hosts are operating in unicast or broadcast mode. The invention may be readily adapted to be used when network hosts are operating in multicast mode. The invention comprises a new Internet Protocol extension header (hereafter referred to as the new extension header) and the processes for generating false packets, deciding when to re-encrypt the message packet body, randomly determining the number of false packets that a host will generate, and determining randomly selected hosts that will receive the false packets. The sending host for a true packet encrypts the true packet body and the new extension header. The new extension header is decrypted and re-encrypted by each host that handles a message packet that uses the new extension header. The new extension header functions to hide each true packet by controlling the random re-encryption of the true packet body at random hosts and by controlling the random generation of false packets at each host visited by a true packet, at the recipient of the true packet, and at any hosts that receive a false packet.

The new extension header may be used for all network message traffic, including bandwidth or quality of service (QOS) probes that are transmitted by a message sender to determine the fragmentation that should be performed on the complete message before it is transmitted. A bandwidth or QOS probe as used herein is a message transmitted from a sender to the intended recipient, all of the hosts along the path between the two hosts respond to the probe with its estimate of the largest packet size that it can manage. The sender uses the responses to determine the size of the message packet body size and the number of packets that should be used for the complete message.

The new extension header is applied individually to each packet to be transmitted and individually to each packet as it moves through the network. All decision making is performed on a packet-by-packet basis at each host. It is assumed that all of the computer hosts that need to make use of the new extension header have the same encryption and decryption procedures/algorithms so that they can encrypt and decrypt the new extension headers whenever it is required. In use, the engineering, run-time choices for the values for requested number of false messages, re-encryption permissions, false message generation probability, and decay rate for the false message generation probability have the largest influence on the bandwidth consumed by the false messages that serve to prevent traffic analysis. There is an engineering, run-time based security versus bandwidth tradeoff that affects the values chosen for these parameters. Larger numbers of false messages and a low false message generation decay probability rate coupled with a high false message generation probability give the greatest security but at the cost of increased network bandwidth consumed and increased computation at the network hosts, the converse values conserve bandwidth and computational resources but also provide a lower level of resistance to network traffic analysis.

FIG. 1 shows in a preferred embodiment of the invention the placement of the new extension header 120 relative to the standard IPv6 headers 140, the TCP header 160, and the message body 180 in the packet. The new extension header should be placed after the standard IPv6 headers and before the standard TCP header. All of the processes described below take place at the Internet Protocol (IP) level of the TCP/IP stack. The invention is readily applicable to other standard protocols as will be apparent to those skilled in the art.

FIG. 2 shows the specification for the new extension header. The specification consists of the name for each field, its size, and a field designator. The fields must be placed within the header in the exact order in which they are listed In FIG. 2. The first field (Field 0 (zero)) in the new extension header contains the size of the extension header, in bits. Field zero is initialized to 562 for each packet. The second field (Field A) in the extension header contains the designator for the type of message and is used to indicate whether the message is a true message or one of three different types of false messages. The third field (Field B) contains the information needed by the true message recipient to determine if it should generate any false messages and, if so, the maximum number of false messages it should transmit. The fourth field (Field C) contains the specification for the minimum number of network hops that the false packets sent by the true packet recipient must traverse before the false packet reaches its intended recipient. Field five (Field D) contains the specification for the minimum size (in bytes) of any false packet data segments that are generated as a result of the transmission of the true packet. Field six (Field E) contains the specification for the maximum size (in bytes) of any false packet data segments that are generated as a result of the transmission of the true packet. Field seven (Field F) contains the size (in bytes) of the true packet data segment. Field eight (Field G) contains the IPv6 address of the sender of the true message. Field nine (Field H) indicates whether re-encryption (that is, encryption of the encrypted message data segment (or payload) without decrypting it) of a true packet data segment or a false packet data segment is permitted. Field ten (Field I) contains the probability value to be used to determine if a false packet should be generated by any host in response to the receipt of a true or false packet. Field eleven (Field J) contains the specification of the decay rate for the false message generation probability, probability decay occurs under specific circumstances as described in the procedures discussed below. Field twelve (Field K) is used to indicate whether an intermediate host has re-encrypted the true packet body while it was enroute from the packet sender to its actual destination (desired recipient). Field thirteen (Field L) contains the specification of the re-encryption probability. This value is used by any host that receives the packet to determine if the message packet body (the IP data segment) should be re-encrypted at the host. Field fourteen (Field M) is used to maintain the count of the number of re-encryptions performed on the packet data segment while it was enroute from the packet sender to its destination (desired recipient). Field fifteen (Field N) holds the pointer values to each decryption key for each encryption performed on the packet body while it was enroute from the sender to the intended recipient. The decryption key is needed to properly decrypt the message body, when an intermediate host performs an encryption on a packet body it appends a 128-bit designator to the decryption key needed to undo the encryption. At the recipient of a true packet, the pointers are used to extract the true packet body, the designators are used in the order of from last to first; the decryption pointer for the encryption performed on the packet by the very last host is at the end of the field, the decryption pointer for the encryption performed on the packet by the very first host to perform an encryption on the data segment is at the start of the field. The length of the field is determined by the number of encryptions performed by the intermediate hosts; and is equal to 128 times the total number of encryption performed on the packet by the intermediate hosts.

FIG. 3 defines each field of the new extension header. The Extension Header Size Field 310 defines the size (in bits) of the invention's extension header within the current packet. The bit value for the field is the binary representation for the numeric value for the number of bytes in the entire new extension header. The Packet Type Field 312 defines the type of packet being transmitted. There are four values for this field, with each value indicating a different type of packet. The values and their meanings are: 00 True packet; 01 First generation false packet; 10 Second or later generation false packet; 11 First generation false packet generated by an Intermediate host between originator and intended recipient of true packet. The Requested Number of False Packets Field 314 defines the number of first generation false packets requested to be generated by each and every message packet recipient. The bit value for the field is the binary representation for the numeric value for the maximum number of false packets to be generated by each and every true packet recipient. The numeric value preferably ranges from $2^0$ to $2^8$. The Minimum Hops for False Packet Field 316 defines the number of hops within the network that a false packet must complete (according to the host look-up table or other such information) In order for the selected destination host for the false packet to be acceptable. The bit value for the field is the binary representation for the numeric value for the minimum number of hops that must be completed. The Minimum False Packet Body Size (Bytes) Field 318 contains the minimal size In bytes of the payload (data segment) In the packet for a false packet. The bit value for the field is the binary representation for the numeric value for the minimum number of bytes in the payload (data segment). The Maximum False Packet Body Size (Bytes) Field 320 contains the maximum size in bytes of the payload (data segment) in the packet for a false packet. The bit value for the field is the binary representation for the numeric value for the maximum number of bytes in the payload (data segment). The Baseline False Packet Body Size (Bytes) Field 322 contains the actual size in bytes of the payload (data segment) In the true current message packet. The bit value for the field is the binary representation for the numeric value for the actual number of bytes in the payload (data segment) for the current true message packet. The True Packet Source Address Field 324 contains the IPv6 address for the source computer host of the true packet. The value in this field conforms to the IPv6 specification for host addresses. The Re-encryption Permitted Field 326 indicates whether intermediate hosts can add a new level of encryption to packet by re-encrypting the body of the message packet. There are two possible values for this field, zero (0) and one (1) with the following definitions/meanings applied to each value. For a value of 0 in the field re-encryption of the current packet is not permitted. For a value of 1 in the field re-encryption of the current packet is permitted. The False Packet Generation Probability Field 328 contains the binary value for the false packet generation probability. The values in this field have the following defined meanings. If the value in the field is 0 then the false packet generation probability is zero. If the value In the field is greater than 0 then the false packet generation probability is greater than zero. The value for the false packet generation probability is equal to 1 divided by the decimalized value of the bit representation. The False Packet Generation Probability Decay Rate Field 330 contains the binary value for the false packet generation probability decay rate. If the value in this field is equal to 11111111 (which is the maximum value for the field) then the false packet generation probability is set to zero after generating one false packet at any host. If the value in this field is less than 11111111 then the bit value in this field is to be added to False Packet Generation Probability and used for the value of field 1 for all new false packets generated at an intermediate host in response to the arrival of a packet. The Re-encryption Performed Field 332 indicates whether any intermediate host has re-encrypted the packet body. If the value in this field is equal to zero, then re-encryption on the message packet has not been performed. If the value in this field is equal to one, then re-encryption on the message packet has been performed. The Re-encryption Probability Field 334 contains the binary value for the probability that re-encryption will be performed on the current packet. If the value in this field is equal to zero, then the re-encryption probability is zero and re-encryption of the packet is not permitted. If the value in the field is greater than 0 then the re-encryption is permitted and the re-encryption probability is greater than zero. The value for the re-encryption probability is equal to 1 divided by the decimalized value of the bit representation in this field. The Total Number of Re-encryptions Field 336 contains the count of the number of re-encryptions performed on a given packet as it moved through the network. If the value in this field is zero, then no re-encryptions were performed on the packet. If the value is greater than zero, the value indicates the number of re-encryptions that were performed on the packet. The Decryption Key Pointer Field 338 contains the designators for each decryption key needed to undo encryption applied by an intermediate host. The first entry in the field is the designator for the first decryption key, the last entry is the designator for the last decryption key. The value for each designator conforms to the IPv6 specification for host addresses.

Figure 4:
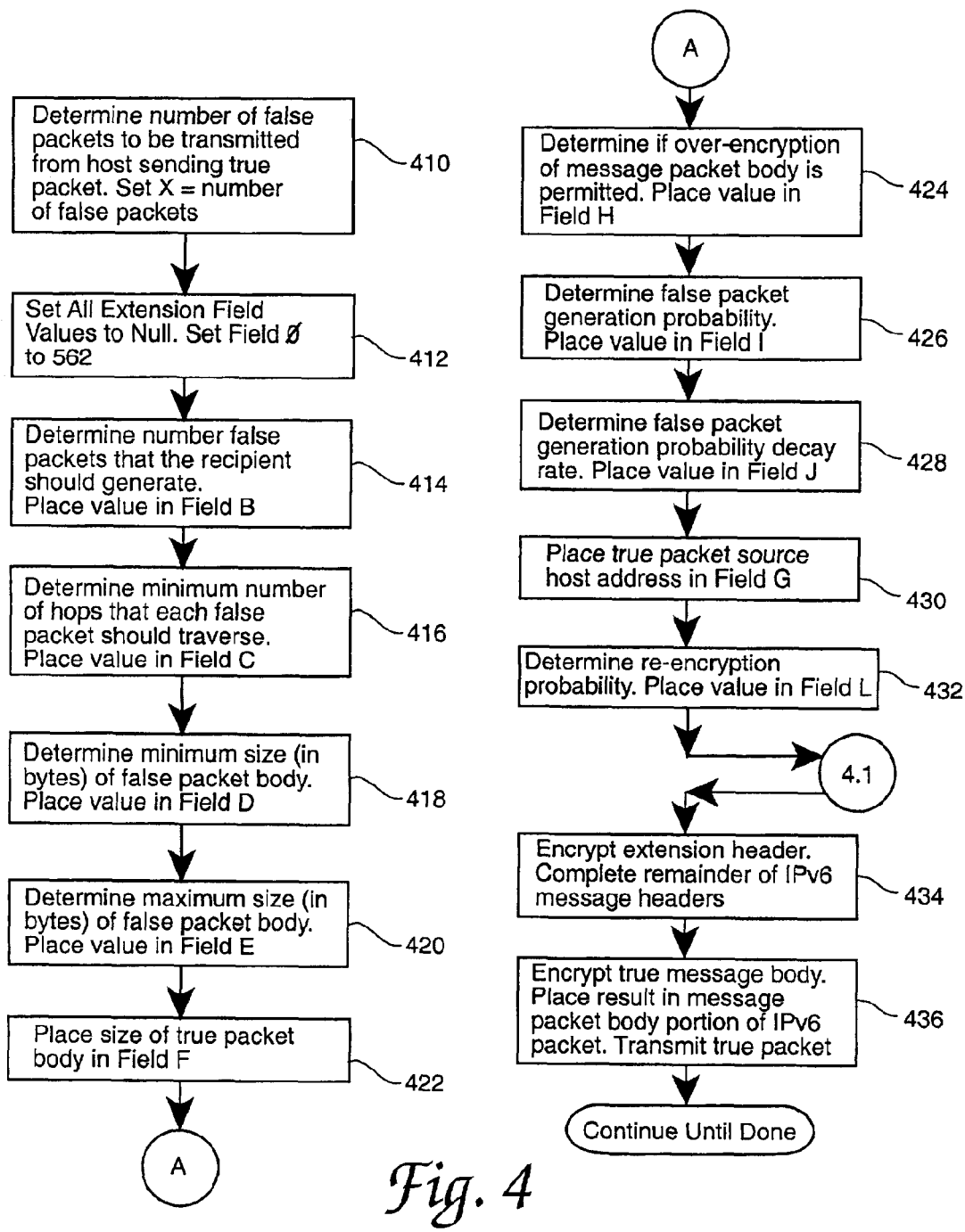
FIG. 4 is a flowchart of a true message sender process.

FIG. 4 presents the processing used by a sender of a true message packet as part of its message generation process at the IP level of the TCP/IP stack. At block 410, processing commences by the sending host determining the number of false packets it will transmit in addition to the single true packet, this number of false packets is stored in the variable X. Block 412 shows that all of the extension header values are then Initialized to null (zero) and Field 0 (zero) is set to the value 562. At block 414, the sending host then determines the number of false packets that the recipient of the true packet should generate, this value is placed in Field B. The value in Field B is also the maximum number of false packets that an intermediate host will generate in response to the arrival of the true packet or the arrival at any host of any false packets generated in response to the transmission of the true packet. At block 416, the sender then determines the minimum number of hops that the false packets sent by the true message recipient should complete, this value is placed in Field C. As shown at blocks 418 and 420, the sender then determines the minimum and maximum size of any false packet body (in bytes) that will be generated by any host in response to the passage of the true packet, these values are placed in Fields D and E respectively. Block 422 shows that the actual size (in bytes) of the true message packet body is placed in Field F. The next step is to determine if over-encryption (re-encryption) of the message packet body will be permitted, if this determination indicates that re-encryption should be permitted Field H is set to a value of 1, otherwise Field H is set to 0. At block 424, the value in Field H is used to control re-encryption of the true packet body and to control re-encryption of the body of any false packets generated as a result of the transmission of the current true packet. As shown in block 426, the next step is to determine the false message generation probability, this eight-bit value is placed in Field I. At block 428, the next step is to determine the false message generation probability decay rate, this eight-bit value is placed in Field J. At block 430, the true packet source host IP address is then placed in Field G since it serves as the decryption pointer for the sender's level of encryption and the new extension header is then encrypted. At block 432, the next step is to determine the re-encryption probability. The sender then stores this 8-bit value in Field L. At this point, procedure 4.1 Is then executed. Once procedure 4.1 is completed, block 434 shows that the sender then encrypts the extension header for the true packet and the remainder of the standard IP headers is then completed. At block 436, the message packet body is then encrypted, and the message packet Is transmitted. This process continues at the sender while packets are available for transmission. All of the determinations made by the sender of a true message packet can be accomplished in either a random manner or they can be based upon a consideration of network traffic load, desired level of security against traffic analysis, packet data segment size, and computational load. This determination can also be accomplished using a combination of these factors within a random selection process. Randomness can increase the degree of resilience to traffic analysis but at the cost of lower control over the dynamic performance of the invention and can lead to over-consumption of bandwidth and computational resources for a desired level of resilience to traffic analysis.

Figure 5:
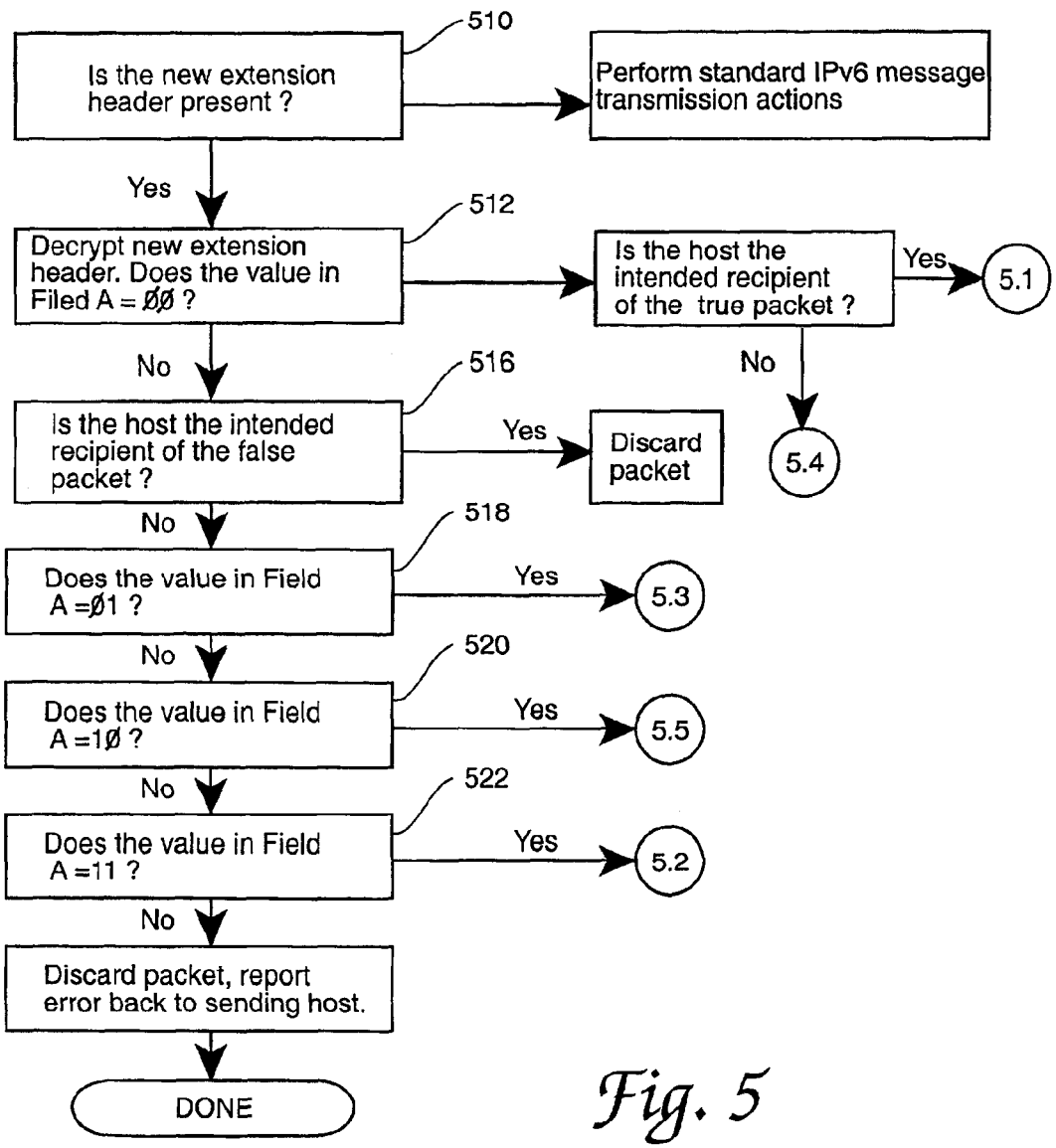
FIG. 5 is a flowchart of the initial message reception decision process at a host computer.

FIG. 5 depicts the decision process followed by a network computer host when it receives a packet. The general strategy followed in this procedure is to determine if the packet is a true packet and if so, to determine if It has arrived at its intended recipient. If the packet has arrived at its intended recipient, then a procedure is invoked to process the packet and to generate false message traffic to obscure the intended message packet recipient and true packet(s). If the message packet is not a true packet or is a true packet that has not arrived at its desired recipient, then procedures are invoked that serve to obscure the true message traffic within false message traffic. As shown at block 510, the first step in the process is determining if the invention's IPv6 extension header is present. If it is not present, then the packet is processed using the standard IPv6 techniques. As shown at block 512, if the new extension header is present, then it is decrypted and the value in Field A is determined. If the value in Field A=00, then the destination address for the packet is determined. If the host is the packet's addressee, then procedure 5.1 is performed, otherwise procedure 5.4 is performed in order to obscure the true message traffic. As shown at block 516, if the value in Field A is not equal to 00 and the host is the addressee, then the message packet is a false packet, that is, a false packet that was generated to obscure the true message traffic and the packet is discarded. If Field A in the packet fails these first two tests, then it is examined further. At block 518, if the value in Field A=01, then procedure 5.3 is performed because the packet is a first generation false packet. At block 520, if the value of Field A is 10, then procedure 5.5 is performed because the packet is a second or subsequent generation false packet. Finally, at block 522, if the value of Field A is 11, then Procedure 5.2 is executed because the packet is a false packet that was generated by an intermediate host (one along the path between the true sender and true recipient). If, somehow, the packet fails all of these tests then the packet is discarded and the sender of the packet is notified.

Figure 6:
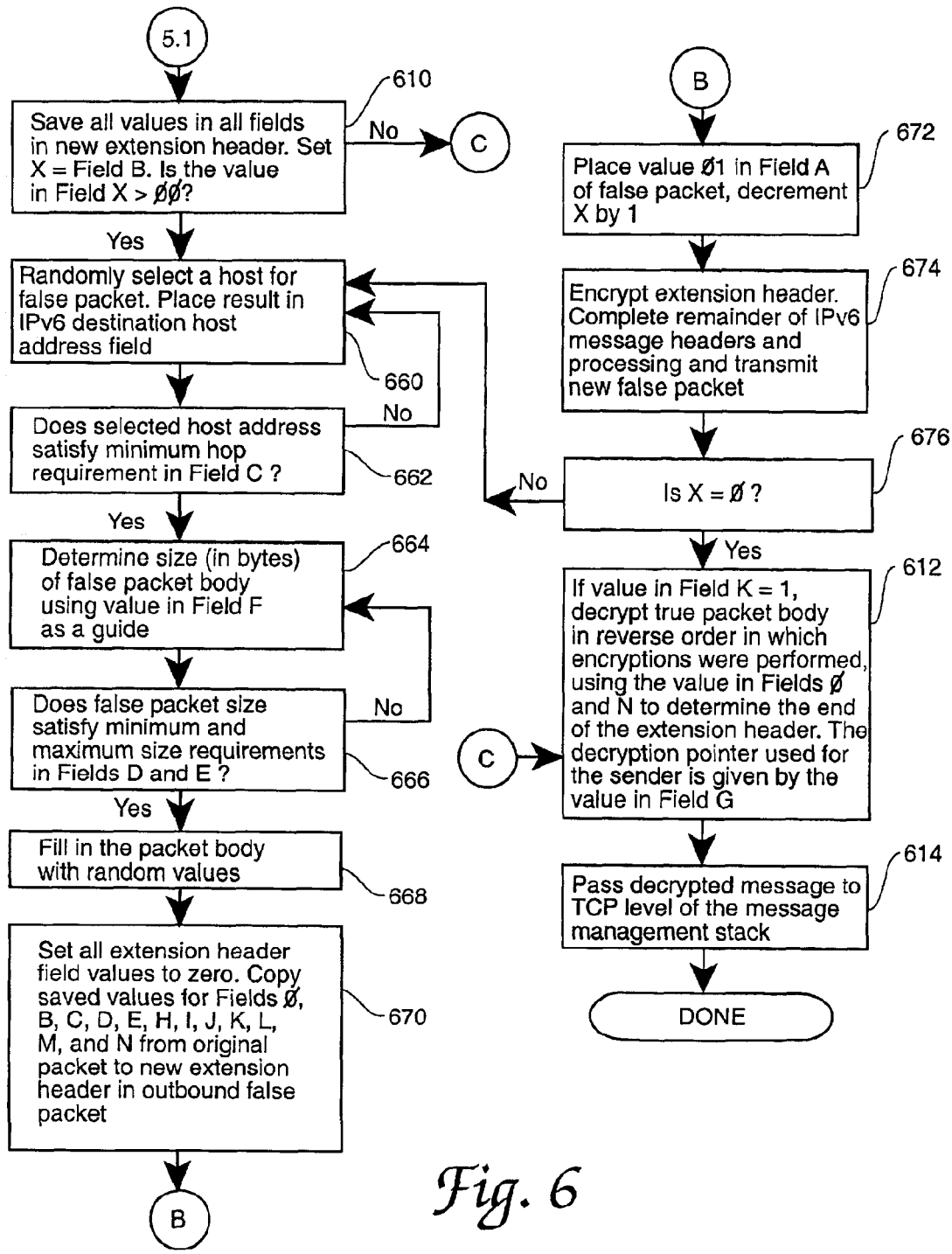
FIG. 6 is a flowchart of procedure 5.1 which is executed when a true packet arrives at its intended recipient.

FIG. 6 depicts the processing performed in Procedure 5.1, which is executed when a true packet arrives at its intended recipient. The general strategy for the processing in this procedure is to generate a number of false packets so as to obscure the actual recipient of the true message and then to decrypt the body of the true packet, by unwinding the encryptions applied enroute from the sender to intended destination in reverse order, and finally to make the packet body available for further processing. Block 610 shows that the first step in Procedure 5.1 is to save all of the values in all of the new extension header fields, set the variable X=the value in Field B, and then to examine variable X and determine its value. If the value of X equals zero, then the sender of the true packet does not want the recipient to generate false packets. Therefore the recipient then simply decrypts the packet message body in the reverse order in which it was encrypted enroute from the sender to recipient as shown at block 612. The order of decryption is given by the sequence of 128-bit decryption pointers placed in Field N, the total number of decryptions to be performed is given by the value in Field M. The length of Field N, in bits, is equal to 128 multiplied by the value of Field M. The actual size of the new extension header (in bits) is given by Field 0. The final decryption action is to decrypt the encryption applied by the sending host, the decryption pointer used for this final decryption is given by the value in Field G. As shown at block 614, after the decryption is complete, the message is passed to the TCP level of the message stack. On the other hand, if the value in Field B is greater than zero the-sender wants the recipient to generate some number of false message packets, that number is given by the value of Field B. If false packets are to be assembled and transmitted, the next step in the process at block 660 is to randomly select a destination for a false packet. At block 662, if the selected host IPv6 address does not satisfy the minimum hop requirement specified saved from Field C, then another host Is selected. Random host selection continues until a host is found that satisfies the minimum hop specification in Field C. At block 664, once the minimum hop requirement is satisfied, then the size of the false message packet body is determined using the value in Field F as a guide and compared against the values in Fields D and E indicated in block 666. At block 668, if the size of the false packet body satisfies the minimum and maximum false packet body values In Fields D and E, then the false message packet body is randomly generated. As shown at block 670, the next step in the process is to set all of the new extension header's field values to null (zero) and then to copy the saved values in Fields 0, B, C, D, E, H, I, J, K, L, M, and N from the incoming true packet to the same fields in the false packet, This copy action is necessary so that recipient of the false packet will know how to process the false packet and so that the size of the extension header in the false packet approximates the size of the extension header in the true packet that just arrived at the host. Note, the false packet will no longer have the address of the originator of the original true message. At block 672, Field A in the false packet is then set to 01 and X is decremented by one. As shown in block 674, the new extension header is then encrypted and the remainder of the IPv6 message processing actions are performed and the false packet is transmitted. If value for the variable X is still greater than zero, false packet generation processing continues and another host is selected and another false packet is generated. False packets continue to be generated and sent to hosts that meet the minimum hop requirement until the value for X decreases to zero. At block 676, once the value for X is zero, then decryption processing (as described above) is performed. In brief, the packet's message body is decrypted in the reverse order in which it was encrypted enroute from the sender to recipient using the method described above and relying upon the values saved for Fields M and N. The decryption pointer used for the sender is given by the value in Field G. The decrypted packet body is then handed to the TCP level of the TCP/IP message processing stack.

Figure 7:
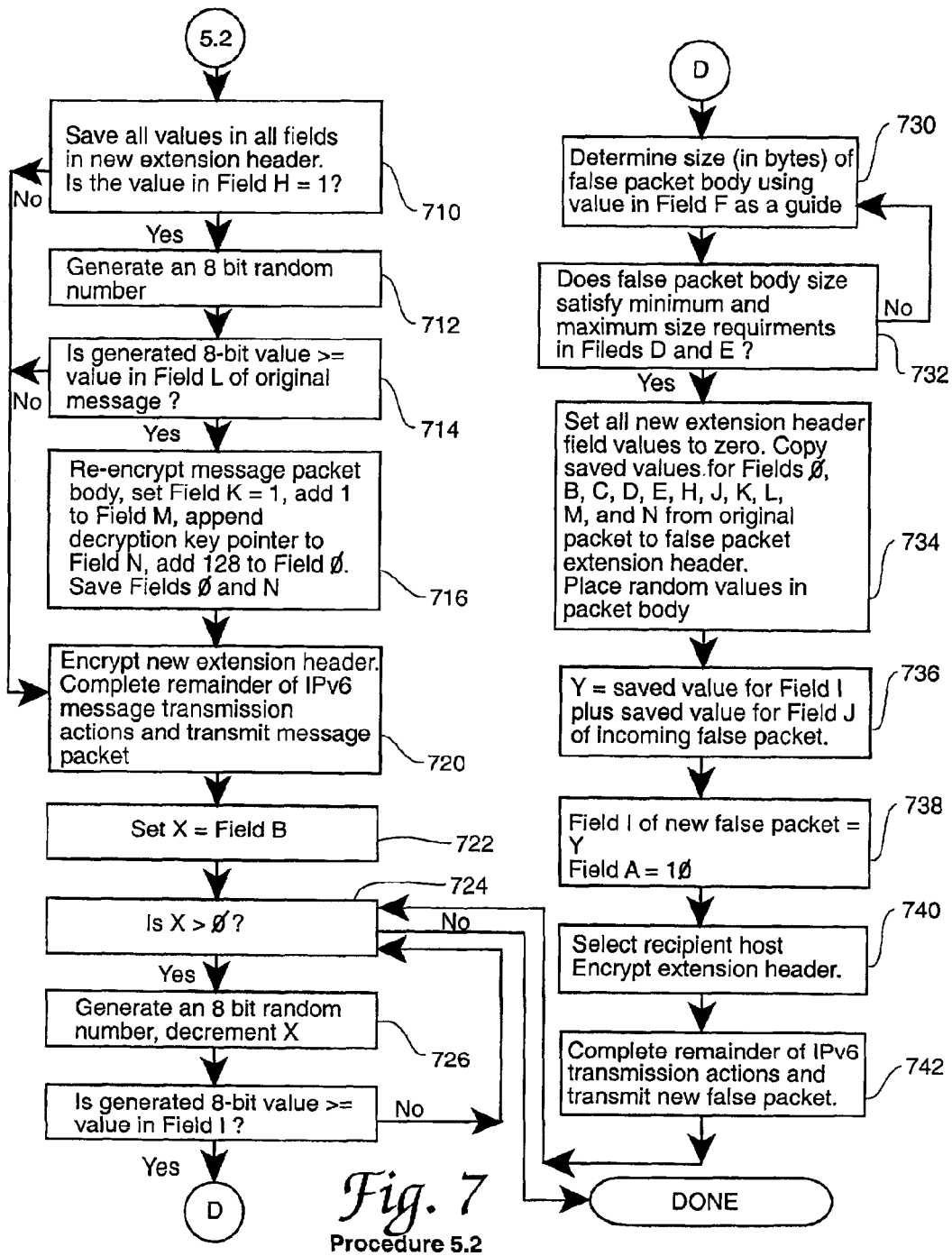
FIG. 7 is a flowchart of procedure 5.2 which is used for processing a false packet at an intermediate host.

FIG. 7 depicts Procedure 5.2, which is used to process a false packet that was generated by a host that is along the route of a true packet from its sender to the intended recipient. The strategy for the processing that occurs in this procedure is to first determine if the packet body should be re-encrypted and then to generate and transmit a random number of false packets to obscure the true packet, the path that the true packet is following, and the actual recipient of the true packet. Re-encryption is performed in order to prevent an outside agency from following the path a packet follows by simply following a bit stream, re-encryption means that the bit values of all packets can change at any time, thereby preventing an outside agency from following the path of a packet through the network without being able to determine the contents of the packet. Processing In this procedure begins at block 710 by storing the values of all of the fields in the new extension header for the incoming message packet and then determining whether the sender of the packet wanted to permit re-encryption of the message packet body. Re-encryption is permitted if the value in Field H=1. If re-encryption is not permitted, the new extension header is encrypted and the remainder of the IPv6 message processing actions are performed and the packet is transmitted. At block 712, if re-encryption is permitted, an 8-bit random number is generated and compared to the value in Field L, which holds the Re-encryption Probability. At blocks 714 and 716, if the value of the random 8-bit number is greater than or equal to the value in Field L, the packet body is re-encrypted, the value of Field K is set to 1 to indicate that re-encryption was performed, the value of Field M is incremented by 1 so that the count of the number of re-encryptions is correct, the decryption key pointer is appended to Field N, the value of Field 0 is incremented by 128, and the new value in Fields 0 and N are saved. As shown at block 720, the new extension header for the arriving packet is then encrypted and the remainder of the IPv6 message processing actions are performed and the packet is transmitted.

In FIG. 7, once the inbound message packet has been processed, then the procedure turns to making a determination of whether false packets should be generated. To insure that the route for the true packet is obscured, each intermediate host is always given the opportunity to generate false packets if the sender has permitted it. At block 722, the first step performed when determining whether to generate false packets is to set a variable X to the value in Field B. At block 724, if the value of X is>0, the sending host requested the generation of false packets by intermediate hosts and by hosts who receive false packets generated by intermediate hosts and has provided the maximum number of false packets that an intermediate host may generate. If the value of X=0, then false packets are not to be generated and processing is complete In the procedure. At block 726, if X>0, X is decremented and an 8-bit random number is generated and compared to the saved value for Field 1. At block 728, if the generated random number is greater than or equal to the value in Field 1, then a false message packet will be generated, otherwise the value of X is again assessed. The decrement, random number generation, comparison cycle continues until the value of X=0, at which time the processing in the procedure is complete. In each cycle where the generated random number is greater than or equal to the saved value for Field 1, a false packet is generated. As shown at block 730, the first step in generating the false packet is to generate a size (in bytes) for the body of the false packet, the value of Field F should be used as a guide in determining the size of the false packet body. Then, at block 732, if the size in bytes of the false packet body does not satisfy the minimum and maximum packet body size requirements set forth in Fields D and E, another size for the packet body is generated. Packet body sizes (in bytes) continue to be generated until a size is generated that satisfies the minimum and maximum body size requirements set forth in Fields D and E. Block 734 Indicates that once a valid size is generated, the extension header must be filled in, this is accomplished by first setting all values In all of the new extension header's fields to null (zero) and then copying the saved values for fields 0, B, C, D, E, H, J, K, L, M, and N from the saved values for the new extension header of the incoming message packet to the corresponding fields In the new extension header of the new false message packet. If re-encryption was performed, the saved values used for Fields 0 and N in the new false packet must be the values that were saved after re-encrypting the message packet body. Then, the false packet body is filled with randomly generated values. The next step in the procedure is to decay the value of the False Packet Generation Probability held in Field 1 for the packet being assembled. Block 736 shows that the False Packet Generation Probability is decayed by adding the False Packet Generation Probability Decay Rate saved from Field J to the False Packet Generation Probability saved from Field I and storing the result in the variable Y. Because of this addition, the probability of generating additional false packets is reduced at any hosts that receive the false packet being assembled at this time. Then at block 738, the value for Field 1 of the new false packet is set to Y and the value for Field A in the false packet is set to 10 to indicate that the false packet is a second generation false packet. At block 740, a recipient host for the false packet is selected and the new extension header is encrypted. At block 742, the remainder of the IPv6 message processing actions are completed, the false packet is transmitted, and the procedure loops back to determine if additional false packets should be generated and assembled.

Figure 8:
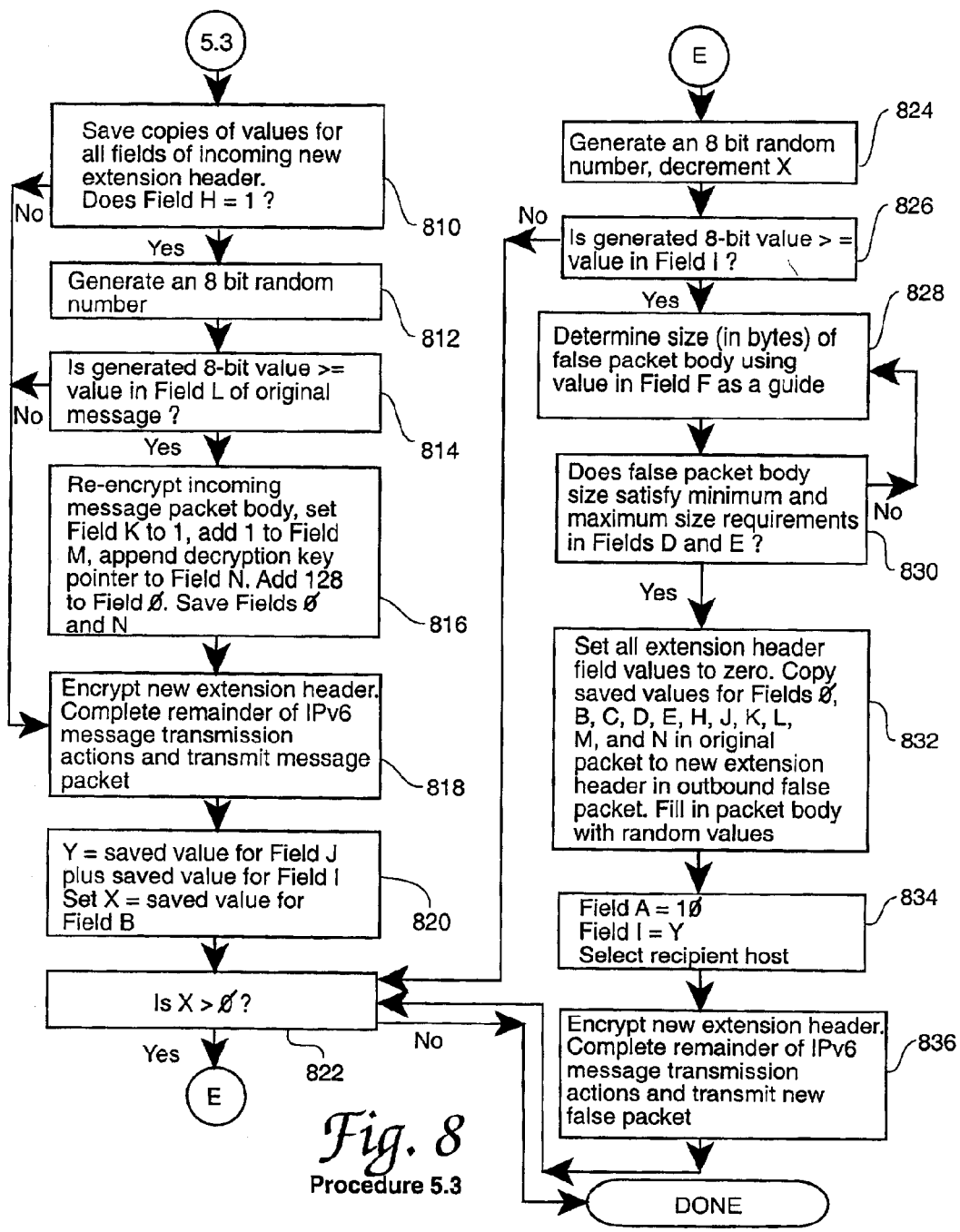
FIG. 8 is a flowchart of procedure 5.3 which is used for processing subsequent false packets.

FIG. 8 contains Procedure 5.3, which is used to process message packets at a host that has received a first generation false packet that was generated by the recipient of a true packet. Procedure 5.3 is preferably also used to process second and subsequent generation false packets that have arrived at a host. The strategy for this procedure is to first determine if the packet body should be re-encrypted and then to generate and transmit a random number of false packets to obscure the recipient of the true packet as well as the path of the true packet through the network. Re-encryption is performed in order to prevent an outside agency from following the path a packet follows by simply following a bit stream, the use of re-encryption means that the bit values of all packets can change at any time, thereby preventing an outside agency from following the path of a packet through the network. Processing in this procedure begins at block 180 by storing the values In all of the new extension header fields in the incoming message packet and then determining whether the sender of the original true packet wanted to permit re-encryption of the message packet body, re-encryption is permitted if the value in Field H=1. If re-encryption of the packet body is not permitted, the new extension header is encrypted and the remainder of the IPv6 message processing actions are performed and the packet is transmitted. If re-encryption of the packet body is permitted, as shown at block 812, an 8-bit random number is generated and compared to the value in Field L, which holds the Re-encryption Probablity. At blocks 814 and 816, if the value of the random 8-bit number is greater than or equal to the value In Field L, the packet body is re-encrypted, the value of Field K is set to 1 to indicate that re-encryption was performed, the value of Field M is incremented by 1 so that the count of the number of re-encryptions is correct, the decryption key pointer for the encryption key that was used is appended to Field N, the value of Field 0 is incremented by 128, and the values of Fields 0 and N are saved. At block 818, the new extension header is then encrypted and the remainder of the IPv6 message processing actions are performed and the packet is transmitted.

In FIG. 8, once the inbound message packet has been processed, then the procedure determines whether false packets should be generated. At block 820, the False Packet Generation Probability must be decayed for use in packets being assembled at this host by adding the False Packet Generation Probability Decay Rate that was stored from Field J to the False Packet Generation Probability stored from Field 1 and then storing the result in the variable Y. Because of this addition, the probability of generating additional false packets for second and subsequent generation false packets is reduced at any hosts that receive the false packets that will be assembled. The next step performed is to set a variable X to the value In Field B. Then at block 822, if the value of X is>0, the sending host of the original true packet requested the generation of false packets and has provided the maximum number of false packets that the host Is allowed to generate. If the value of X=0, then false message packets are not to be generated and processing is complete In the procedure. If X>0, an 8-bit random number is generated and X is decremented at block 824. At block 826, the value of the 8-bit number is then compared to the saved value for Field I. If the generated random number is greater than or equal to the value in Field I, then a false packet will be generated, otherwise the value of X is again compared to zero. The decrement, random number generation, comparison cycle continues until the value of X=0, at which time the processing in the procedure is complete. In each cycle where the generated random number is greater than or equal to the saved value for Field 1, a false packet will be generated. As shown at block 828, the first step in generating the false packet is to generate a size (in bytes) for the body of the false packet, the value of Field F should be used as a guide in determining the size of the false packet body. At block 830, if the size in bytes of the false packet body does not satisfy the minimum and maximum packet body size requirements set forth in Fields D and E, another size for the packet body is generated. Packet body sizes (in bytes) continue to be generated until a size is generated that satisfies the minimum and maximum body size requirements set forth in Fields D and E. As shown at block 832, once a valid packet body size is generated, the extension header must be filled in, this is accomplished by first setting all values in all of the new extension header's fields to null (zero) and then copying the saved values for the fields 0, B, C, D, E, H, J, K, L, M and N from the saved extension header values in the incoming message packet's extension header to the corresponding fields in the extension header of the new false packet. If re-encryption was performed, the saved values used for Fields 0 and N in the new false packet must be the values that were saved as a result of re-encrypting the message packet body. Then, the false packet body is filled with randomly generated values. At block 834, the next step in generating the false message packet is to set the value of Field A=10, thereby Indicating that this is a second or subsequent generation false packet. Field 1 is set to the value stored in the variable Y (which is the decayed the False Packet Generation Probability) and a recipient host for the false packet is selected. At block 836, then the new extension header is encrypted, the remainder of the IPv6 message processing actions are completed, the false packet is transmitted, and the procedure loops back to determine if additional false packets should be generated and assembled. The procedure continues to loop until it terminates when X=zero.

Figure 9:
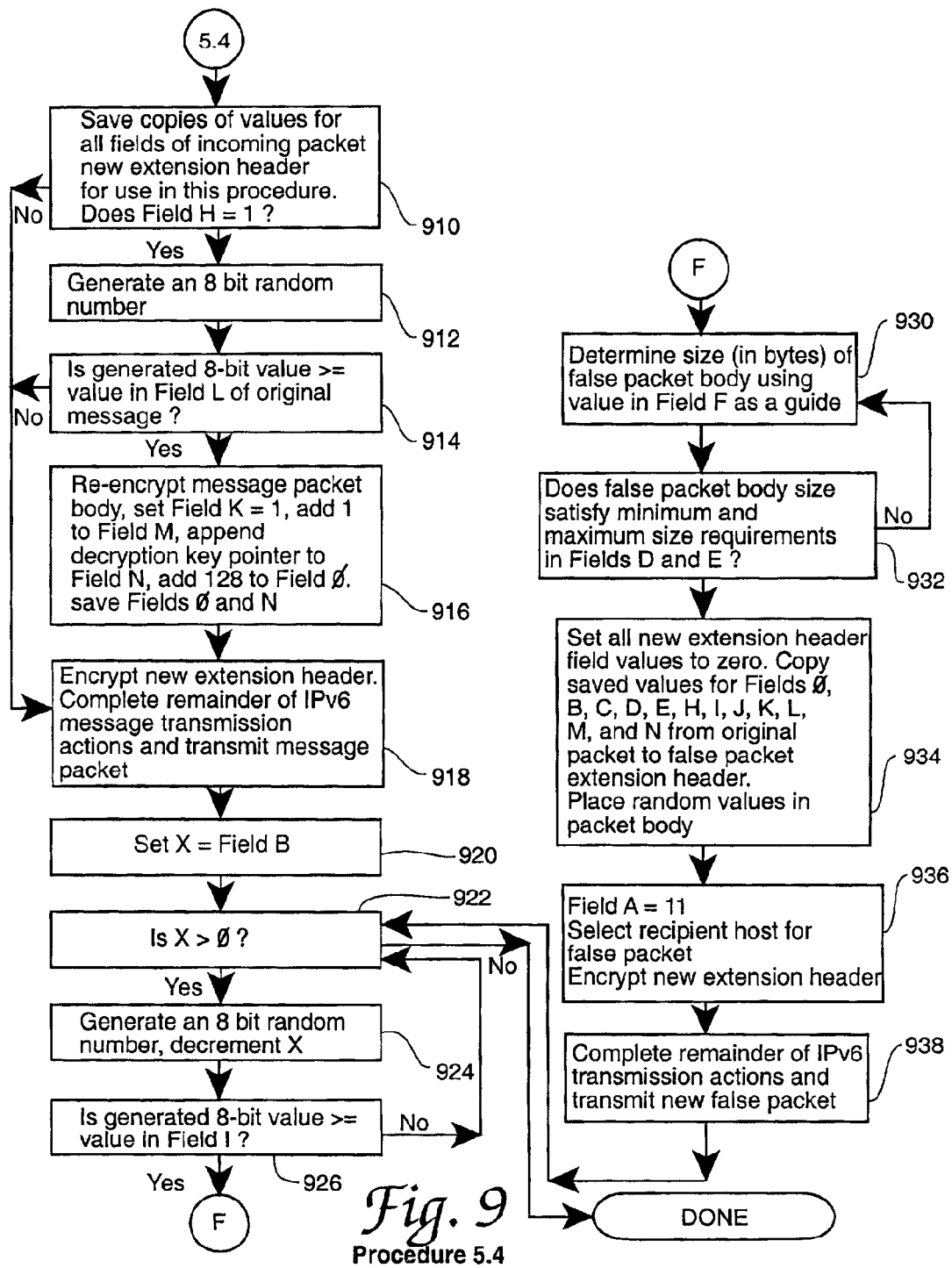
FIG. 9 is a flowchart of procedure 5.4 which is used for processing a true packet at an intermediate host.

FIG. 9 contains Procedure 5.4, which is used to process true packets at an intermediate host that has received a true packet that is enroute to its intended recipient. The strategy for this procedure is to first determine if the packet body should be re-encrypted and then to generate and transmit a random number of false packets to obscure the recipient of the true packet as well as the path of the true packet through the network. Re-encryption is performed in order to prevent an outside agency from following the path a packet follows by simply following a bit stream, the use of re-encryption means that the bit values of all packets can change at any time, thereby preventing an outside agency from following the path of a packet through the network. The process begins at block 910 by storing the values in all of the new extension header fields in the incoming message packet and then determining whether the sender of the original true packet wanted to permit re-encryption of the message packet body, re-encryption Is permitted if the value in Field H=1. If re-encryption of the packet body is not permitted, the extension header is encrypted and the remainder of the IPv6 message processing actions are performed and the packet is transmitted. If re-encryption of the packet body is permitted, an 8-bit random number is generated at block 912 and compared at block 914 to the value in Field L, which holds the Re-encryption Probablity. At block 916, if the value of the random 8-bit number is greater than or equal to the value in Field L, the packet body is re-encrypted, the value of Field K is set to 1 to indicate that re-encryption was performed, the value of Field M is incremented by 1 so that the count of the number of re-encryptions is correct, the decryption key pointer for the encryption key that was used is appended to Field N, the value of Field 0 is incremented by 128, and the new values of Fields 0 and N are saved. At block 918, the new extension header is then encrypted and the remainder of the IPv6 message processing actions are performed and the packet is transmitted.

In FIG. 9, once the inbound message packet has been processed, then the procedure determines whether false packets should be generated. Note that the False Packet Generation Probability is not decayed in this procedure, which means that outgoing false message packets will have the same False Packet Generation Probability as the true message, probability decay will be performed on second and subsequent generation false packets that arise from the false packet being assembled in Procedure 5.4. The first step performed at block 920 is to set a variable X to the value in Field B. Then at block 922, if the value of X is>0, the sending host of the original true packet requested the generation of false packets and has provided the maximum number of false packets that the host is allowed to generate. If the value of X=0, then false packets are not to be generated and processing is complete for the procedure. At block 924, if X>0, an 8-bit random number is generated and X is decremented by 1. The value of the 8-bit number is then compared to the saved value for Field 1. At block 926, if the generated random number is greater than or equal to the value in Field 1, then a false packet will be generated, otherwise the value of X is again compared to zero. The decrement, random number generation, comparison cycle continues until the value of X=0, at which time the processing in the procedure concludes. In each cycle where the generated random number is greater than or equal to the saved value for Field 1, a false packet will be generated. As shown in block 930, the first step in generating the false packet is to generate a size (in bytes) for the body of the false packet, the value of Field F should be used as a guide in determining the size of the false packet body. At block 932, if the size in bytes of the false packet body does not satisfy the minimum and maximum packet body size requirements set forth in Fields D and E, another size for the packet body is generated. Packet body sizes (in bytes) continue to be generated until a size is generated that satisfies the minimum and maximum body size requirements set forth in Fields D and E. At block 934, once a valid packet body size is generated, the invention's extension header must be filled in, this is accomplished by first setting all values in all of the new extension header's fields to null (zero) and then copying the saved values for the fields 0, B, C, D, E, H, 1, J, K, L, M and N from the saved new extension header values in the Incoming message packet's extension header to the corresponding fields in the extension header of the new false packet. If re-encryption was performed, the saved values used for Fields 0 and N in the new false packet must be the values that were saved after re-encrypting the message packet body. Then, the false packet body is filled with randomly generated values. At block 936, the next step in generating the false packet is to set the value of Field A=11, thereby indicating that this is a first generation false packet that was generated by an intermediate host. Then a recipient host for the false packet is selected and the extension header is encrypted. At block 938, the remainder of the IPv6 message processing actions are completed, the false packet is transmitted, and the procedure loops back to determine if additional false packets should be generated and assembled. The procedure continues to loop until it concludes when X=zero.

Figure 10:
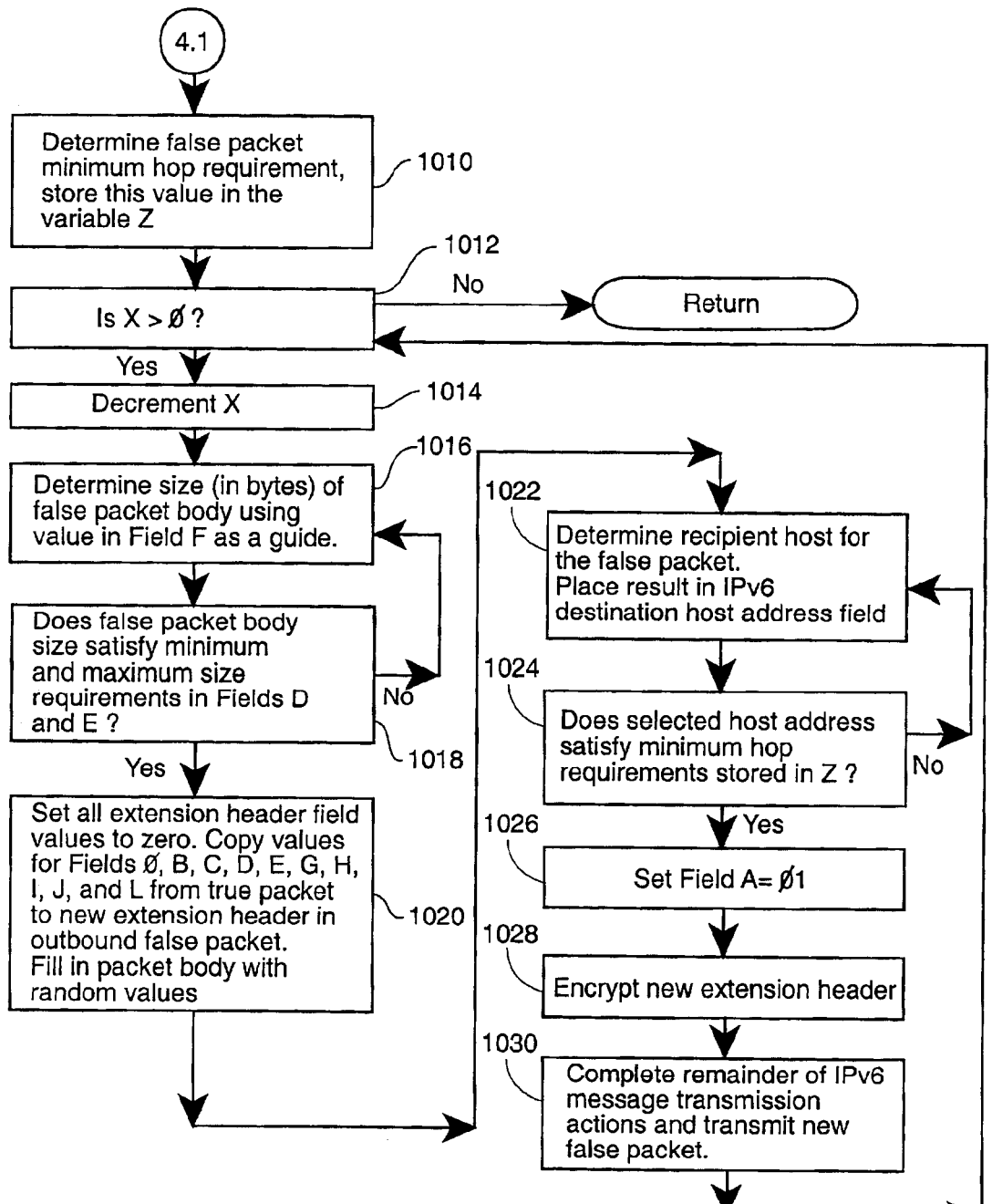
FIG. 10 is a flowchart of procedure 4.1 which is used for assembling and transmitting false packets at a sending host computer.

FIG. 10 contains Procedure 4.1, which is used by the sending host for a true packet to assemble and transmit false packets. The strategy for this procedure is to generate or assemble and transmit a random number of false packets to obscure the sender of the true packet as well as the path of the true packet through the network. The sending host has already determined the number of false packets it will transmit in addition to the single true message packet and this number of false packets is stored in the variable X. Upon entry into this procedure, the sending host first determines at block 1010 the minimum number of hops that each false packet must complete before it reaches it destination, this number is stored in the variable Z. At block 1012, if the value of X is>0, the sending host has determined the maximum number of false packets that will be generated. If the value of X=0, then false packets are not to be generated and processing is complete in the procedure and the processing returns to the processing defined in FIG. 4. At block 1014, if X>0, then X is decremented. The decrement, compare, and generate cycle continues until the value of X=0, at which time the processing in the procedure is complete and the processing returns to the processing defined in FIG. 4. In each cycle where a false packet is generated, the first step in generating the false packet, as shown at block 1016, is to generate a size (in bytes) for the body of the false packet, using the value of Field F for the true packet as a guide in determining the size of the false packet body. At block 1018, the size in bytes of the false packet body is compared against the minimum and maximum packet body size requirements set forth in Fields D and E. If it fails the test, another size for the packet body is generated. Packet body sizes (in bytes) continue to be generated until a packet body size is generated that satisfies the minimum and maximum packet body size requirements set forth in Fields D and E for the true message packet. Once a valid packet body size is generated, the new extension header is filled in. This is accomplished at block 1020 by first setting all values in all of the extension header's fields to null (zero) and then copying the values for the fields 0, B, C, D, E, G, H, I, J, and L from the true packet extension header values to the corresponding fields in the new extension header for the new false packet. Then, the false packet body is filled with randomly generated values. At block 1022, a recipient host for the false packet is selected and this address is placed Into the IPv6 address field. At block 1024, the recipient address is then checked to insure that It satisfies the minimum hop requirement stored in Z, if it does not a different recipient is selected. Host selection continues until a host that satisfies the minimum hop requirement stored in Z is found. At block 1026, the next step in generating the false packet is to set the value of Field A=01, thereby indicating that this is a first generation false packet. At block 1028, the new extension header is encrypted. At block 1030, the remainder of the IPv6 message processing actions are completed, the false packet is transmitted, and the procedure loops back to determine if additional false packets should be generated and assembled. The procedure continues to loop until it concludes when X=zero.

It is understood that certain modifications to the invention as described may be made, as might occur to one with skill in the field of the invention, within the scope of the appended claims.

Therefore, all embodiments contemplated hereunder which achieve the objects of the present Invention have not been shown in complete detail. Other embodiments may be developed without departing from the scope of the appended claims. For example, the minimum hop requirement In field C can be used in Procedures 5.2, 5.3, 5.4, and 5.5 when selecting a recipient host to receive the false packets that are generated as described herein. Also, the features of the Invention as described herein could be readily implemented in other protocols as would be apparent to those skilled in the art.

PROGRAM LISTING DEPOSIT

The program listing is submitted separately on compact disc.

What is claimed is:

1. A system for preventing analysis and monitoring of network traffic between network host computers wherein false packets are generated and transmitted along with a true packet to hide actual message traffic flow, said system comprising:

an extension header positioned in a hierarchy of Internet protocol headers controlling passage of the false packets and the true packet through a network, said extension header having a plurality of fields;

a sending host computer having means for filling said fields with values designating the size of said extension header, a message packet type, a maximum number (X) of false packets to be generated, a minimum number of hops that the false packets will traverse, a minimum and maximum and baseline false packet body size, a source address for the true packet, whether re-encryption is permitted, a false packet generation probability, a decay rate for the false packet generation probability, a total number of re-encryptions performed, and a decryption key pointer value;

means for generating at the sending host computer a plurality of false packets for each true packet; and means for transmitting the false packets and the true packet containing said Internet protocol headers and said extension header over said network to at least one intermediate host computer and a recipient host computer.

2. The system of claim 1, further including:

said least one intermediate host computer and a recipient host computer having means for generating and transmitting further false packets according to the false packet generation probability.

3. The system of claim 2, further including:

means for changing the false packet generation probability using the decay rate for the false packet generation probability.

4. The system of claim 3, wherein said extension header is inserted within the Internet protocol headers in the hierarchy of headers.

5. The system of claim 4, wherein said means for generating at the sending host computer a plurality of false packets for each true packet comprises:

means for storing the value of said minimum number of hops that each false packet will traverse;

means for determining if the number of false packets (X) is>0;

means for decrementing X;

means for determining the size of each false packet body using the baseline false packet body size as a reference;

means for determining if each false packet body size satisfies the minimum and maximum size limits designated in said fields;

means for setting the value of all said fields to 0, means for copying the values of selected fields from the true packet into the extension header for a false packet, and means for filling said baseline false packet body size with random values;

means for selecting a recipient host address for each false packet;

means for determining if the selected recipient host address satisfies the minimum number of hops for each false packet;

means for designating the message packet type; and means for encrypting said fields for each false packet.

6. The system of claim 5, further including:

means for generating a random number of false packets to be transmitted from the sending host computer;

means for generating a random number of false packets to be transmitted from the recipient host computer;

means for generating a random minimum number of hops that each false packet will traverse;

means for generating a random minimum number representative of the body size of each said false packet;

means for randomly determining whether over-encryption of each said false packet body is permitted; and means for generating a random number representative of the false packet generation probability and decay rate for the false packet generation probability for each said false packet.

7. The system of claim 3, wherein X is a binary number ranging from $2^0$ to $2^8$.

8. The system of claim 2, wherein said at said at least one intermediate host computer and said recipient host computer having means for generating and transmitting further false packets according to the false packet generation probability comprises:

means for storing values of all said fields;

means for determining from said values whether re-encryption of the message packet is permitted;

means for generating a random number and comparing it to the value in said fields indicative of the re-encryption probability, means for re-encrypting the false packet body, means for incrementing the total number of re-encryptions performed, means for appending the decryption pointer to the value in said fields, and means for increasing the value in said fields of the size of the extension header, and determining if (X)>0;

means for decrementing X;

means for determining a size of a new false packet body using said values as a guide;

means for determining from said values whether the size of the new false packet body satisfies minimum and maximum size limits in said fields;

means for designating the message packet type; and means for encrypting said fields for each new false packet.

9. The system of claim 8, further including:

means for repeatedly decrementing X, determining a size of a new false packet body using said values as a guide, determining from said values whether the size of the new false packet body satisfies minimum and maximum size limits in said fields, selecting the message packet type, and encrypting said fields for each new false packet, until X=0.

10. A method for preventing network data packet switching traffic analysis by generating and transmitting false packets along with a true packet to hide actual message traffic flow, comprising the steps of:

a. inserting an extension header having a plurality of fields in a hierarchy of Internet protocol headers controlling passage of the false packets and the true packet through a network;

b. at a sending host computer, filling said fields with values designating the size of said extension header (O), a message packet type (A), a maximum number (X) of false packets to be generated (B), a minimum number of hops that the false packets will traverse (C), a minimum (D) and maximum (E) and baseline (F) false packet body size, a source address (G) for the true packet, whether re-encryption is permitted (H), a false packet generation probability (I), a decay rate for the false packet generation probability (J), a total number of re-encryptions performed (M), and a decryption key pointer value (N);

c. generating at the sending host computer a plurality of false packets for each true packet;

d. transmitting the false packets and the true packet containing said Internet protocol headers and said extension header over said network;

e. at an intermediate and recipient host computer, decrypting the extension header and determining whether the packet is true or false;

f. if false, determining from the false packet generation probability whether to generate a new false packet;

g. changing the false packet generation probability using the decay rate for the false packet generation probability;

h. decrementing X and filling said fields with values designating the new false packet;

i. transmitting the new false packet containing the extension header to a subsequent host computer; and j. repeating steps h. and i. until X=0.

11. A method according to claim 10, wherein said step of generating at the sending host computer a plurality of false packets for each true packet further includes:

a. storing the value of said minimum number of hops that each false packet will traverse;

b. determining if the number of false packets (X) is>0;

c. if yes, decrementing X;

d. determining a size of the false packet body using the baseline false packet body size (F) as a reference;

e. determining if the false packet body size satisfies the minimum (D) and maximum (E) size limits designated in said fields;

f. if yes, setting the value of all said fields to 0, copying the values for selected fields from the true packet into the extension header for a new false packet, and filling said new false packet body with random values;

g. selecting a recipient host address for the new false packet;

h. determining if the selected recipient host address satisfies the required minimum number of hops (C);

i. if yes, selecting the message packet type (A);

j. filling said fields with values designating the new false packet;

k. transmitting the new false packet; and l. repeating steps c through k until X=0.

12. A method according to claim 10, wherein said step of filling said fields further includes:

a. generating a random number for the false packets to be transmitted from the sending host computer;

b. generating a random number for the false packets to be transmitted from the recipient host computer;

c. generating a random number for the hops that each false packet will traverse;

d. generating a random number representative of the body size of each said false packet;

e. randomly determining whether over-encryption of each said false packet body is permitted; and f. generating a random number representative of the false packet generation probability and the decay rate for the false packet generation probability for each said false packet.

13. The method of claim 10, further including the step of inserting the extension header within the internet protocol headers in the hierarchy of headers.

14. The method of claim 10, wherein said step of transmitting from the intermediate and recipient host computer a new false packet further includes:

a. storing values of all said fields;

b. determining from said values whether re-encryption of message packets is permitted;

c. if yes, generating a random number and comparing it to the value in said fields indicative of the re-encryption probability;

d. if said random number is greater than the re-encryption probability, re-encrypting the false packet body, incrementing the total number of re-encryptions performed (M), appending the decryption key pointer to the value in (N), increasing the value of the size of the extension header (0), and determining if (X)>0;

e. if yes, decrementing X f. determining a size of the new false packet body using the baseline false packet body size (F) as a reference;

g. determining from said values whether the size of the false packet body satisfies the minimum (D) and maximum (E) size limits in said fields;

h. filling said extension header with the stored values of all said fields and transmitting said new false packet containing said extension header to another computer; and i. repeating the steps e. through h. until X=0.

15. A method for preventing network data packet switching traffic analysis by generating and transmitting false packets along with a true packet to hide actual message traffic flow, comprising the steps of:

a. inserting an extension header having a plurality of fields in a hierarchy of internet protocol headers controlling passage of the false packets and the true packet through a network;

b. at a sending host computer, filling said fields with values designating the size of said extension header (0), a message packet as true or false (A), a maximum number (X) of false packets to be generated (B), a minimum number of hops that the false packets will traverse (C), a minimum (D) and maximum (E) and baseline (F) false packet body size, an address (G) for the true packet, whether re-encryption is permitted (H), a false packet generation probability (I) a decay rate for the false packet generation probability (J), a total number of re-encryptions performed (M), and a decryption key pointer value (N);

c. generating at the sending host computer a plurality of false packets for each true packet; and d. transmitting the false packets and the true packet containing said Internet protocol headers and said extension header over said network to at least one intermediate and a recipient host computer.

16. The method of claim 15, further including the steps:

a. at the intermediate and recipient host computers, decrypting the extension header and determining whether the packet is true or false;

b. if false, determining from the false packet generation probability whether to generate a new false packet;

c. if true, setting X to the value in (B);

d. decrementing X and filling said fields with values designating the new false packet;

e. transmitting the new false packet containing the extension header to a subsequent host computer; and f. repeating steps b. through e. until X=0.

17. The method of claim 16, wherein said step of transmitting from the intermediate and recipient host computer a new false packet further includes:

a. storing values of all said fields;

b. determining from said values whether re-encryption of message packets is permitted;

c. if yes, generating a random number and comparing it to the value in said fields indicative of the re-encryption probability;

d. if said random number is greater than the re-encryption probability, re-encrypting the false packet body, incrementing the total number of re-encryptions performed (M), appending the decryption key pointer to the value in (N), increasing the value of the size of the extension header (0); and determining if (X)>0;

e. if yes, decrementing X f. determining a size of the new false packet body using the baseline false packet body g. determining from said values whether the size of the false packet body satisfies the minimum (D) and maximum (E) size limits in said fields;

h. filling said extension header with the stored values of all said fields and transmitting said mew false packet containing said extension header to another host computer; and i. repeating the steps e. through h. until X=0.

18. A method according to claim 15, wherein said step of generating at the sending host computer a plurality of false packets for each true packet further includes:

a. storing the value of said minimum number of hops that each false packet will traverse;

b. determining if the number of false packets (X) to be sent is>0;

c. if yes, decrementing X for each false packet transmitted;

d. determining the size of the false packet body using the baseline false packet body size (F) as a reference;

e. determining if the false packet body size satisfies the minimum (D) and maximum (E) size limits designated in said fields;

f. if yes, setting the value of all said fields to 0, copying the values for selected fields from the true packet into the extension header for the new false packet, and filling said new false packet body with random values;

g. selecting a recipient host address for the new false packet;

h. determining if the selected recipient host address satisfies the minimum number of hops (C);

i. if yes, designating the message packet type (A);

j. filling all remaining fields with values designating the new false packet; and k. transmitting the new false packet.

19. A method according to claim 15, wherein said step of filling said fields further includes:

a. generating a random number of false packets to be transmitted from the sending host computer;

b. generating a random number of false packets to be transmitted from the recipient host computer;

c. generating a random number for the minimum number of hops that each false packet will traverse;

d. generating a number representative of the minimum and maximum body size of each said false packet;

e. randomly determining whether over-encryption of each true or false packet body is permitted; and f. generating a random number representative of the false packet generation probability and decay rate for the false packet generation probability for each said false packet.

20. The method of claim 15, further including the step of inserting the extension header within the Internet protocol headers in the hierarchy of headers.

* * * * *